United States Patent
Thomas et al.

(10) Patent No.: US 7,308,473 B1
(45) Date of Patent: Dec. 11, 2007

(54) SYSTEM AND METHODOLOGY THAT FACILITATES CLIENT AND SERVER INTERACTION IN A DISTRIBUTED INDUSTRIAL AUTOMATION ENVIRONMENT

(75) Inventors: David Ellis Thomas, Germantown, WI (US); Taryl Jon Jasper, South Euclid, OH (US); Clifton Harold Bromley, New Westminster (CA); Neville J. Parakh, Delta (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1079 days.

(21) Appl. No.: 10/207,484

(22) Filed: Jul. 29, 2002

(51) Int. Cl.
*G06F 15/16* (2006.01)

(52) U.S. Cl. .................. 709/203; 709/223; 709/226; 707/100

(58) Field of Classification Search .......... 700/83; 709/203, 219, 220, 223, 226, 228, 245; 719/316, 719/330; 707/3, 10, 200, 100
See application file for complete search history.

(56) References Cited

U.S. PATENT DOCUMENTS

| | | | |
|---|---|---|---|
| 5,475,819 A * | 12/1995 | Miller et al. ............... | 709/203 |
| 5,483,652 A * | 1/1996 | Sudama et al. ............ | 707/10 |
| 5,764,910 A | 6/1998 | Shachar | |
| 6,256,031 B1 * | 7/2001 | Meijer et al. .............. | 707/203 |
| 6,408,298 B1 * | 6/2002 | Van et al. .................. | 707/10 |
| 6,574,655 B1 * | 6/2003 | Libert et al. ............... | 707/10 |
| 6,604,148 B1 * | 8/2003 | Dennison .................. | 709/223 |
| 6,751,796 B1 | 6/2004 | Seaman et al. | |
| 6,853,867 B1 | 2/2005 | Klindt et al. | |

* cited by examiner

*Primary Examiner*—Leo Picard
*Assistant Examiner*—Charles Kasenge
(74) *Attorney, Agent, or Firm*—Amin Turocy & Calvin LLP; William R. Walbrun (57) ABSTRACT

The present invention relates to a system and methodology providing a virtual "namespace" architecture between client and server components in an industrial automation environment, wherein the namespace can be a structured store of logical names, instances and definitions, together with access and modification components. An Active Directory Service Interface (ADSI) family can be employed, for example, to navigate and access the namespace structure and contents. The present invention employs the concept of a "service" to encapsulate server-side behavior accessed through the namespace. Thus, logical names can be utilized to decouple client components from the physical location and implementation of server components. Some services, known as "basic services", may ignore the logical container structure exposed by an area model in a namespace. By contrast, services which utilize an area context and a set of named service items to interact with clients can be referred to as "namespace extensions." Further, services known as "context services" may use the area model to scope and control accesses, yet not employ a service item namespace organized by the area model.

34 Claims, 12 Drawing Sheets

SYSTEM AND METHODOLOGY THAT FACILITATES CLIENT AND SERVER INTERACTION IN A DISTRIBUTED INDUSTRIAL AUTOMATION ENVIRONMENT

TECHNICAL FIELD

The present invention relates generally to industrial control systems, and more particularly to a system and methodology to facilitate management and control of distributed applications in an industrial automation environment.

BACKGROUND OF THE INVENTION

Industrial control systems have enabled modern factories to become partially or completely automated in many circumstances. These systems generally include a plurality of Input and Output (I/O) modules that interface at a device level to switches, contactors, relays and solenoids along with analog control to provide more complex functions such as Proportional, Integral and Derivative (PID) control. Communications have also been integrated within the systems, whereby many industrial controllers can communicate via network technologies such as Ethernet, Control Net, Device Net or other network protocols and media and also communicate to higher level computing systems. Generally, industrial controllers utilize the aforementioned technologies along with other technology to control, cooperate and communicate within and across multiple and diverse applications.

At the core of the industrial control system is a logic processor such as a Programmable Logic Controller (PLC). Programmable Logic Controllers are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

Industrial controllers and associated control systems have increasingly become more sophisticated and complicated as control applications have been distributed across the plant floor and in many cases across geographical or physical boundaries. As an example, multiple controllers and/or other devices may communicate and cooperate to control one or more aspects of an overall manufacturing process via a network, whereas other devices may be remotely located, yet still contribute to the same process. In other words, control applications have become less centrally located on a singular control system having associated responsibilities for an entire operation. Thus, distribution of the overall control function and/or process frequently occurs across many control components, systems or devices.

Due to the distributed nature of modern control systems, it has become more difficult to achieve reliable communications, control and operational harmony amongst diverse components that are often only bound via common network connections. Thus, many network components do not operate according to well-coordinated software interactivity even though the network components may communicate via common network protocols such as Ethernet. For example, custom interfaces and/or communications configurations may have to be developed for each control component residing on the network in order for the control components to act in a coordinated manner. As the number of components increase, costly start-up time and development efforts are expended in order to cause the control components to communicate and ultimately cooperate to achieve an overall manufacturing process or outcome.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate optimized communications and interactions between control components operating in a distributed industrial controller environment. A service architecture is provided that includes a set of naming and/or binding conventions along with supporting mechanisms which connect client, server, peer and/or other control components. The service architecture provides a framework of conventions and supporting components that facilitate exposure of services, as supported by server components, to one or more client applications. It is noted that although the server components can be distributed from other respective components, the server components generally do not have to be resident on remote computers in order for client components employing the service architecture to connect or bind to the server components.

According to one aspect of the present invention, a physical topology of computers and automation devices cooperate with a logical access hierarchy and a family of virtualized automation service behaviors. Thus, various aspects of an automation solution are provided, wherein physical, logical and behavioral dimensions are considered and addressed. In this manner, the present invention maps these aspects into a consistent whole thereby mitigating the number of custom "user" mappings or interfaces. The mappings provided by the service architecture include several aspects. One such aspect is that of a "namespace", which can be modeled as a structured hierarchy of logical names and definitions, including access and modification mechanisms employed to access such information. Another aspect is that of a virtualized "service", that is, a behavior supported by one or more server processes and accessed via the namespace. Yet another aspect is that of a directory or "bind context", which identifies a point of access to a respective service. As will be described in more detail below, binding and/or naming conventions can be achieved via explicit, absolute designations or can be achieved via relative names or relative binding contexts that operate as an indirect or implied addressing or mapping convention between respective contexts, components, and services.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology providing a virtual "namespace" architecture between client and server components in an industrial automation environment, wherein the namespace can be a structured store of logical names, instances, and definitions, together with access and modification components. An interface family known as Active Directory Service Interface (ADSI) can be employed, for example, to navigate and access the namespace structure and contents. The present invention employs the concept of a "service" to encapsulate server-side behavior accessed through the namespace. Thus, logical names can be utilized to decouple client components from the physical location and implementation of server components. Clients use logical service and item names to interact with servers, as opposed to physical location information and server-specific connection data.

Some services, known as "basic services", may ignore the logical container structure exposed by an area model in a namespace. By contrast, services which utilize an area context and a set of named service items to interact with clients can be referred to as "namespace extensions." Further, services known as "context services" may use an area model to scope and control accesses, yet not employ a service item namespace organized by the area model.

Figure 1:
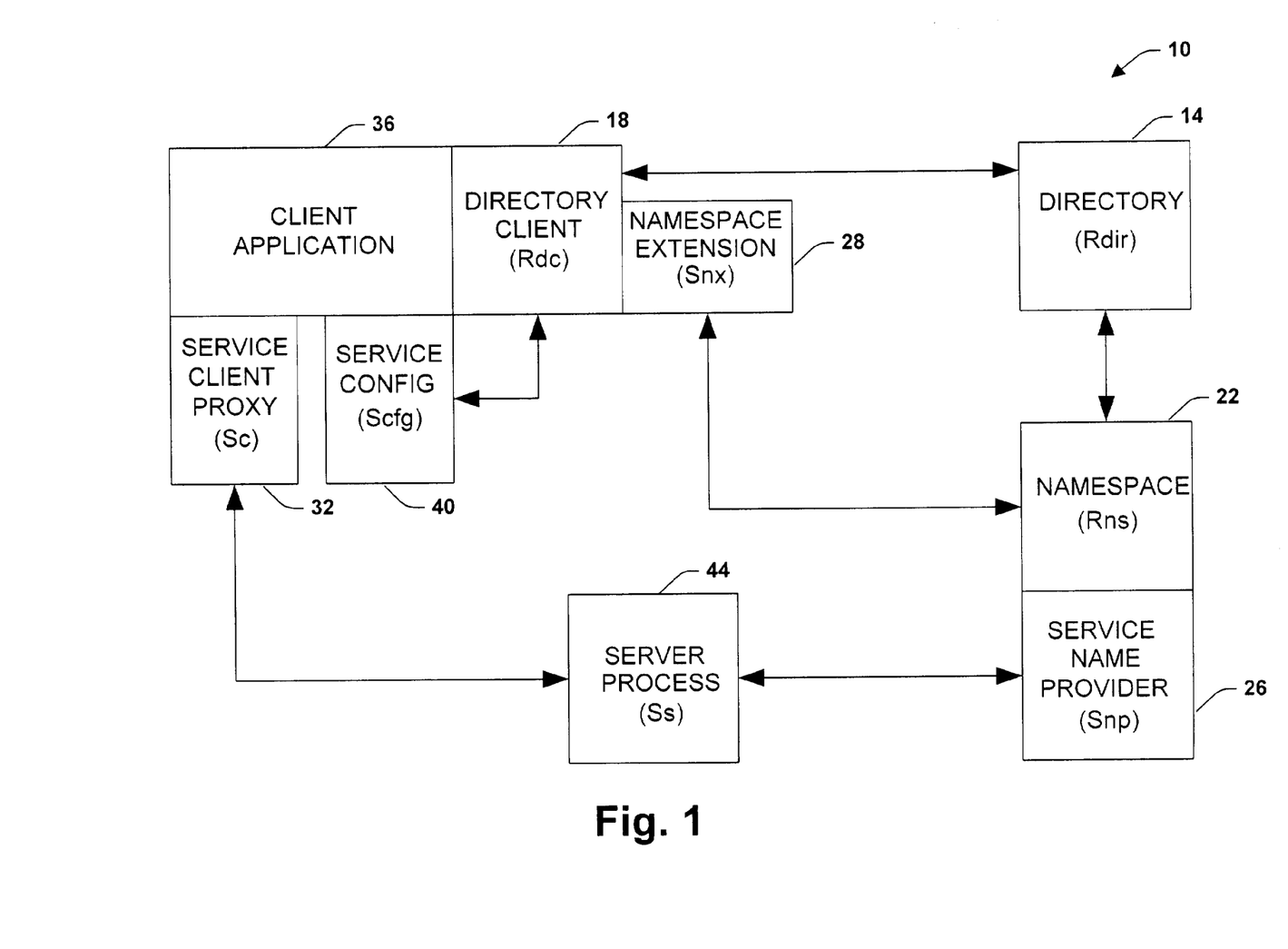
FIG. 1 is a schematic block diagram illustrating a service architecture in accordance with an aspect of the present invention.

Referring initially to FIG. 1, a schematic block diagram illustrates a service architecture 10 in accordance with an aspect of the present invention. The service architecture 10 provides an industrial automation model and environment, wherein remote/disparate client and server automation components can interact and cooperate to control an industrial process. It is noted that nomenclature $R_{xx}$ represents service architecture elements, whereas $S_{xx}$ represents components specific to a service. It is also noted that described component interactions of adjoining components can reside in similar or shared processes. In addition, change notification and redundancy management components can be provided. These components are not shown.

The service architecture includes a directory 14 ($R_{DIR}$) that provides a persistent store of "globally interesting" or relevant information for one or more control components. The directory 14 includes "Tier" Directory objects which are described below and can include Applications, Areas, and Directory Entries, for example. The scope of the directory 14 may be local to a machine or global to a network, for example. A directory client ($R_{DC}$) 18 (e.g., a component exposing ADSI interfaces) interacts with the directory 14 to provide support for access to directory content. The directory client 18 can include service management interfaces for service binding via directory entries and host basic, context and namespace extension service components.

A namespace server 22 ($R_{NS}$) is provided that aggregates service item names in areas to provide tier two or higher (tiers described below in FIG. 2) service item namespaces. The namespace server 22 generally expects server-specific components implementing a name provider interface and resolves service item names into server connection data. A name provider 26 ($S_{NP}$) extracts service item names from supporting server processes and exposes internal structure of tier service item names. A namespace extension 28 ($S_{NX}$) exposes service item names via ADSI or other interfaces and can act as a bridge between tier namespace components.

The service architecture 10 also includes a service client proxy ($S_C$) 32 that provides a client-side Application Programming Interface (API). In addition, the client proxy 32 can manage multiple servers on behalf of a client application 36. A service configuration 40 ($S_{CFG}$) component facilitates creating and editing directory areas and entries to expose services and to define servers. A server process 44 ($S_S$) supports service behavior and exposes the behavior to one or more clients 36 via service-specific interfaces and transport mechanisms accessed via the service architecture 10. Multiple server processes can participate, each contributing service item names to the aggregated service item namespace. Thus, the service architecture 10 incorporates multiple perspectives in a client and server environment including logical, physical, and behavioral aspects. These aspects can be permutations of access, computer and service dimensions of the namespace, for example.

Figure 2:
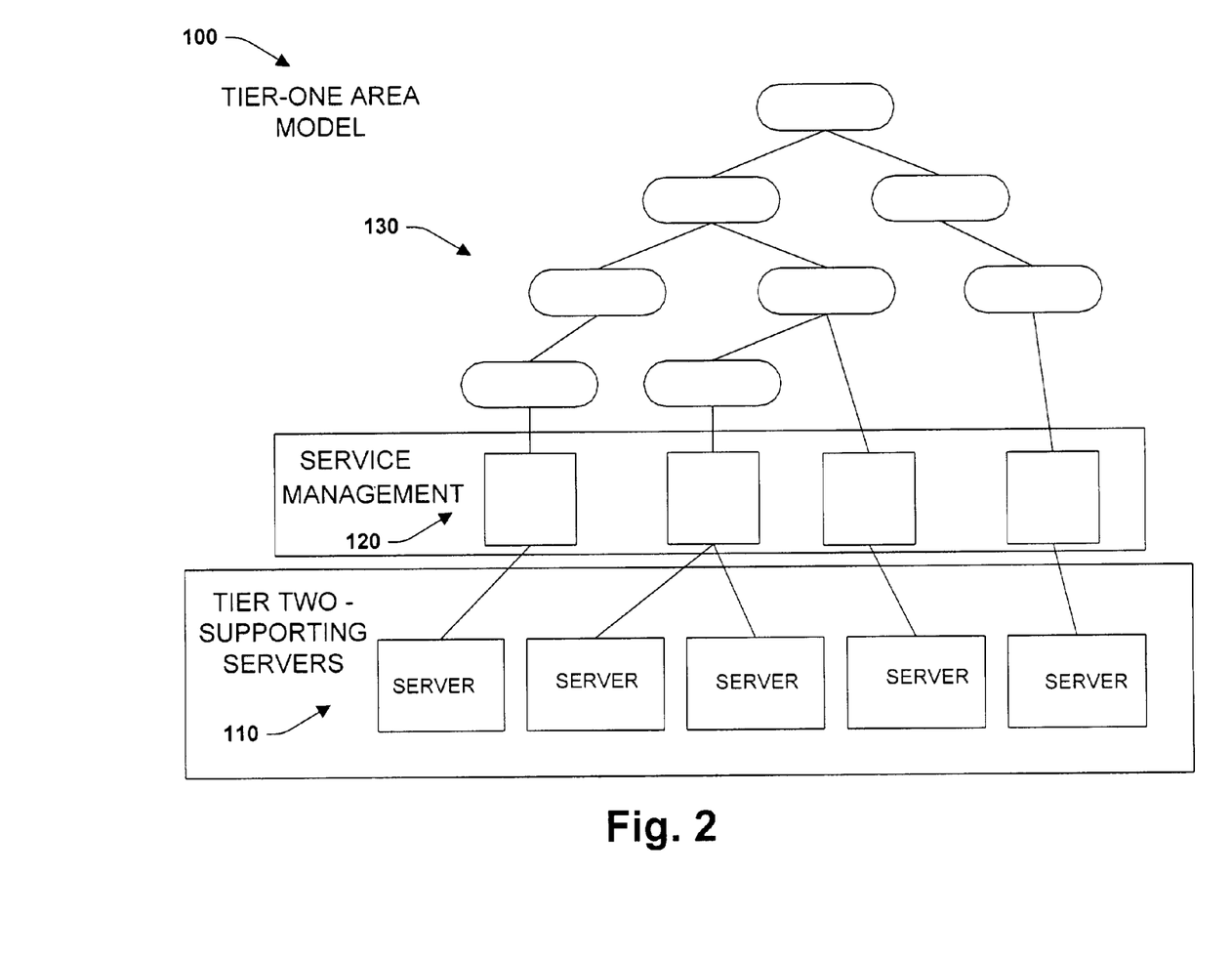
FIG. 2 is a block diagram illustrating a multi-tier architecture in accordance with an aspect of the present invention.

Referring now to FIG. 2, a multi-tiered namespace architecture is provided for constructing a namespace in accordance with an aspect of the present invention. A tree structure 100 organizes access to multiple individual server processes 110 (e.g., five) in multiple (e.g., four) area containers 120. An upper tier 130, can be implemented as a directory system element, and can be structured as a composite tree of containers and directory entries. The containers model includes logical groupings or "areas", wherein one possible analogy is to physical locations within an installation. The composite tree of logical containers or "area model" can represent other groupings natural to an automation solution.

A lower tier of the namespace can be formed by aggregating service item names, owned and defined by server software components, within the context of an area 120. This can be achieved via service management behaviors in a directory system element and collaborating service item name management behavior carried out by the namespace server component, described above. Service item names generally are not stored in the directory. Rather, directory entries carry information referencing the server process which supports a given service and hence a set of service names. Service name syntax and definition typically remains the responsibility of the server processes participating in the service. A knowledgeable process (also known as a namespace server) can take this information, contact the referenced server processes, extract service item names from those processes, and aggregate them within the context of an area 120. This forms a service item namespace, organized by the area access hierarchy and accessible to clients via ADSI or other interface component, and possibly accessible via some service-specific interface family.

Service item names are generally required to be unique within an area 120. Thus, name collisions within an area are resolved by pre-pending the service item name with a logical server process name. Beyond names, an entity referenced by a service item name can carry additional properties, properties accessible via ADSI or other interface and possibly a service-specific mechanism. A similar string can appear in different service namespaces as a service item name within a given area 120. This is not prohibited by namespace composition mechanisms, but this usage may be somewhat more difficult in practice.

Figure 3:
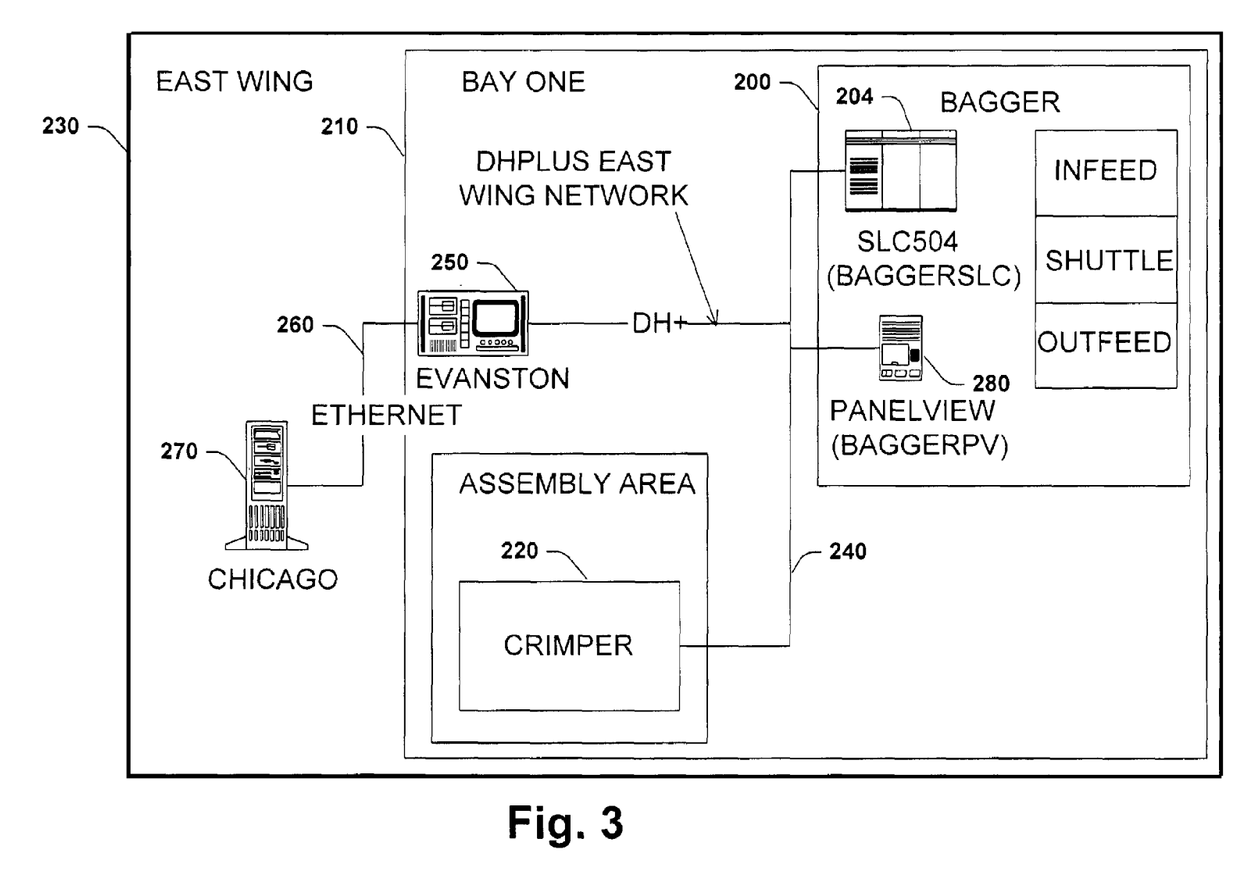
FIG. 3 is a schematic block diagram illustrating an exemplary industrial controller environment in accordance with an aspect of the present invention.

Referring now to FIG. 3, an exemplary namespace is illustrated in accordance with an aspect of the present invention. A relatively straight-forward situation involves a generic piece of manufacturing equipment, for example. An application referred to as a "Bagger" 200 including an industrial controller 204 is placed in a physical situation of industrial control components and associated networks, as illustrated in FIG. 3. It is to be appreciated that the configuration depicted in FIG. 3 is exemplary in nature and a plurality of other configurations are possible in accordance with the present invention.

The machine is located in a physical area called "Bay One" 210, together with a machine called a "Crimper" 220. Bay One 210 can be part of a larger physical space named "East Wing" 230, thus, several other bays could also exist. One or more automation devices can operate the Bagger 200, including a Data Highway Plus (DH+) network or other type network 240 which connects the devices, and a rack mount computer 250 located in Bay One. The DH+ network 240 is known by plant personnel as the "DHPlus East Wing Network", the full extent of this factory automation network is not shown in FIG. 3. The rack mount computer 250 is also a node on an Ethernet network 260 in which the system administrator has chosen to name network machines using place names, thus a large server machine 270 is called "Chicago", while the smaller, more focused rack mount computer 250 is called "Evanston".

A process on Evanston 250 is referred to as "MfgComms". This process reads data values from the industrial controller 204 operating the Bagger machine 200 over the DH+ network 240. MfgComms can be a data access server, exposing respective data items via OLE for Process Control Data Access (OPC-DA) interfaces, for example. A string "$DataItems" identifies the data access service that is implemented in a namespace extension, which indicates its service item names appear in the area access hierarchy.

Figure 4:
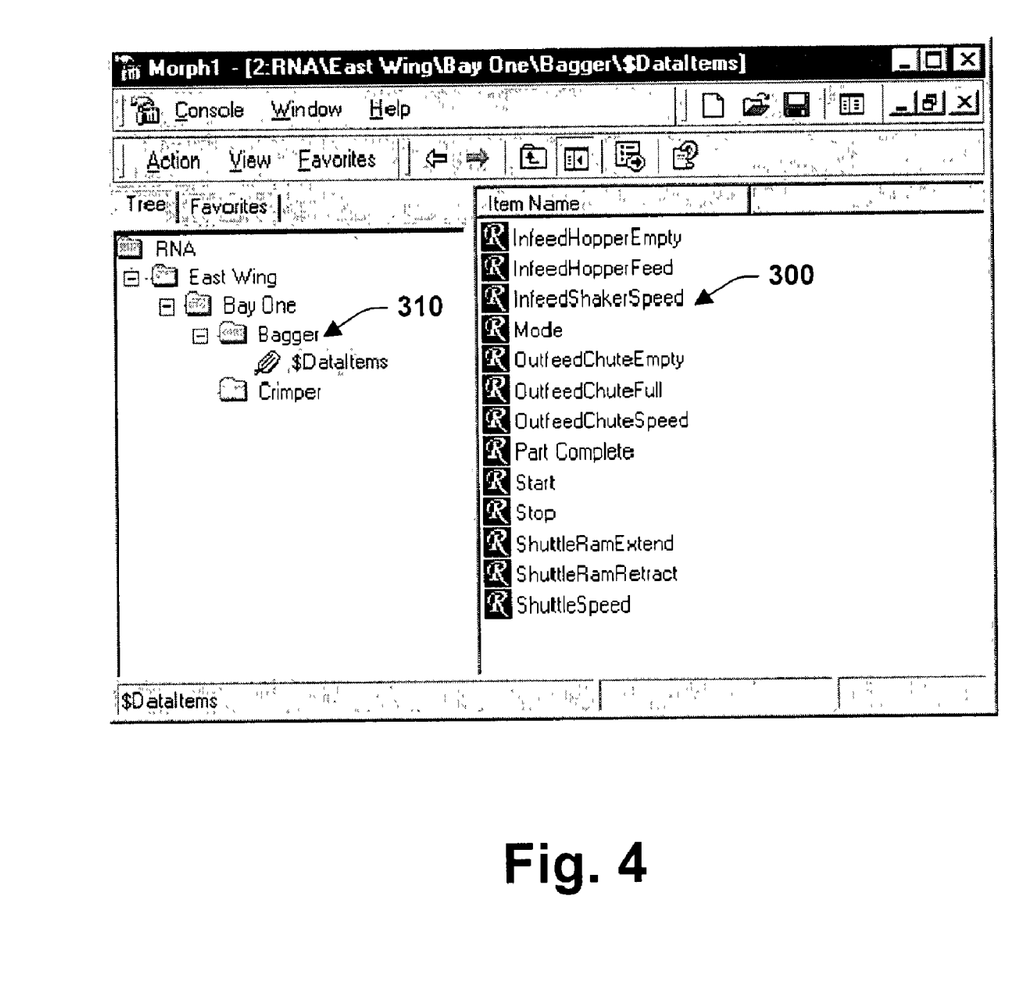
FIG. 4 is a diagram illustrating a service item namespace in accordance with an aspect of the present invention.

Assuming a system management tool that can browse service namespaces (e.g., a service and ADSI aware browser component), an illustration as in FIG. 4 depicts a data access service in this example. Thus, with a single server process supporting the data access service, service item names 300 generally are required to be unique within server boundaries, and the service 310 is exposed in the "Bagger" area of the access hierarchy. Given ADSI or other types of interfaces, the directory and namespace server components cooperate to present a navigable namespace of data access service item names as illustrated in FIG. 4, wherein an access hierarchy of areas act as containers. This hierarchy maps to the physical plant floor layout illustrated in FIG. 3.

This information can be exposed to a user in a data access enabled product. The canonical example can be a component which currently acts as an OLE for Process Control (OPC) client, sinking data values from OPC servers. Clients of this sort can become data access client applications by utilizing ADSI and service management interfaces to bind to the data items service in the Bagger area, establishing a "bind context" and obtaining an IOPCServer interface, and utilize data access service item names, either absolute or relative to the bind context, to establish OPC advise connections.

The data access service namespace of FIG. 4 also illustrates a namespace extension service. The Service Architecture hosts some data access components to realize the data access service item namespace shown FIG. 4, and to enable data access clients to obtain and employ a service-specific client-side interface, namely IOPCServer, for example. Subsequent sections below illustrate the Service Architecture and service-specific components. What has been described thus far are data item names supported by the MfgComms process which have been exposed in an access hierarchy of area containers. If additional servers existed in this situation, the respective servers names can also be aggregated into the data access service item namespace.

In order to issue messaging commands across a factory network like DH+ (or other network), the MfgComms process employs network addresses and other, possibly device-specific formatting information to form messages for those devices. One possible way to operate with this is to collect the information into a structure with a human-legible name, and use this name to refer to the physical device. Thus, from the physical layout diagram in FIG. 3, the industrial controller 204 is called "BaggerSLC" and an HMI device 280 is known as "BaggerPV." From the physical diagram, the "DHPlus East Wing Network" 240 is a name for the factory network connecting substantially all the devices in substantially all the bays in the east wing of the plant. The logical names used in the MfgComms process can be similar to the names that identify the physical automation devices.

Since the Service Architecture is extensible, MfgComms can expose a factory network navigation or "factory topology" service, in which the factory networks and connected devices appear as service items. Further, this topology service can employ a network.device form of name structure to identify devices. Again, as in the data access case above, the Service Architecture hosts some service-specific components to support the "FactoryDevices" service as a namespace extension.

Figure 5:
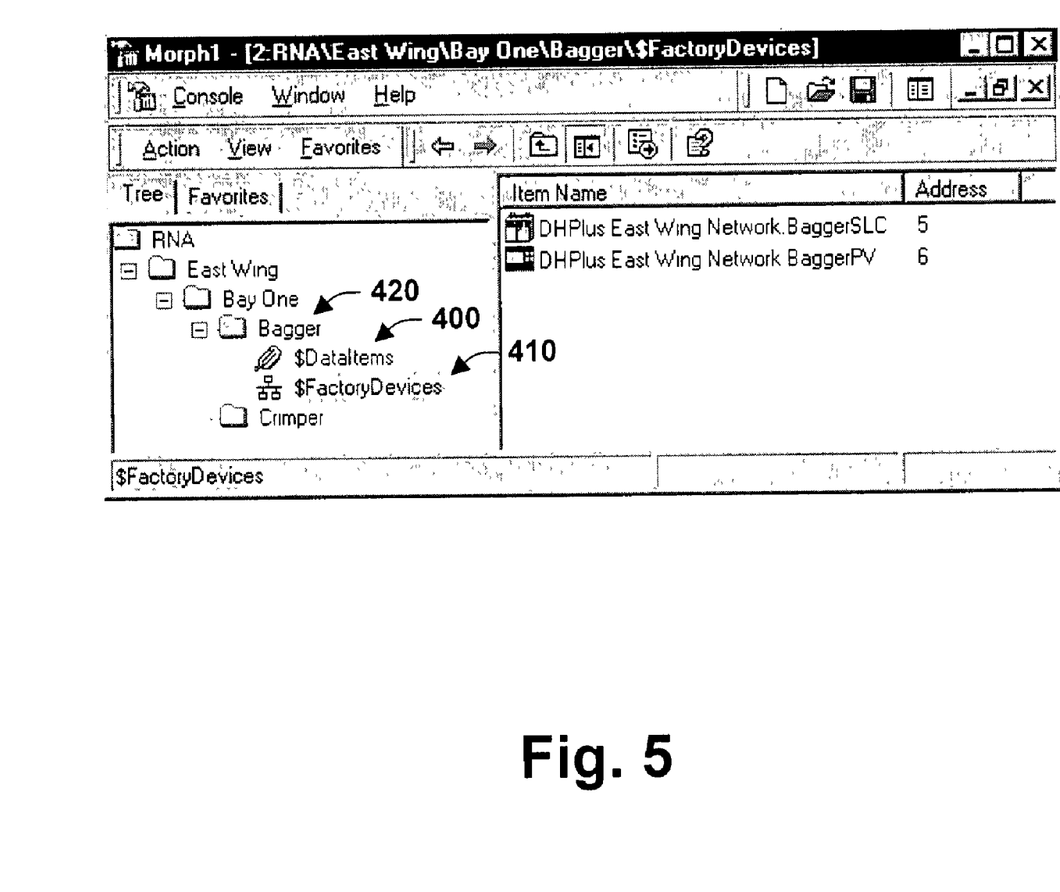
FIG. 5 is a diagram illustrating a network device topology service in accordance with an aspect of the present invention.

FIG. 5 illustrates an exemplary "factory topology" service in accordance with an aspect of the present invention. In this example, two services, $DataItems 400 and $FactoryDevices 410 are exposed in the Bagger area 420. It is to be appreciated that a plurality of other services can be similarly exposed. According to a MfgComms process described above, a "network" can be a collection of connected factory automation devices. Thus, the mechanics of command and data exchange with factory devices, as implemented by MfgComms, employ network and device names to construct communication paths.

The notion of a container to scope service items names can be useful. For example, since ADSI reflects container/child relationships, and one aspect of the Service Architecture is to present, via ADSI, a seamless, navigable hierarchy from names owned by disparate sources, it can be expected to, expose the "DHPlus East Wing Network" as a container in a $FactoryDevices service 508 which is illustrated in FIG. 6.

Figure 7:
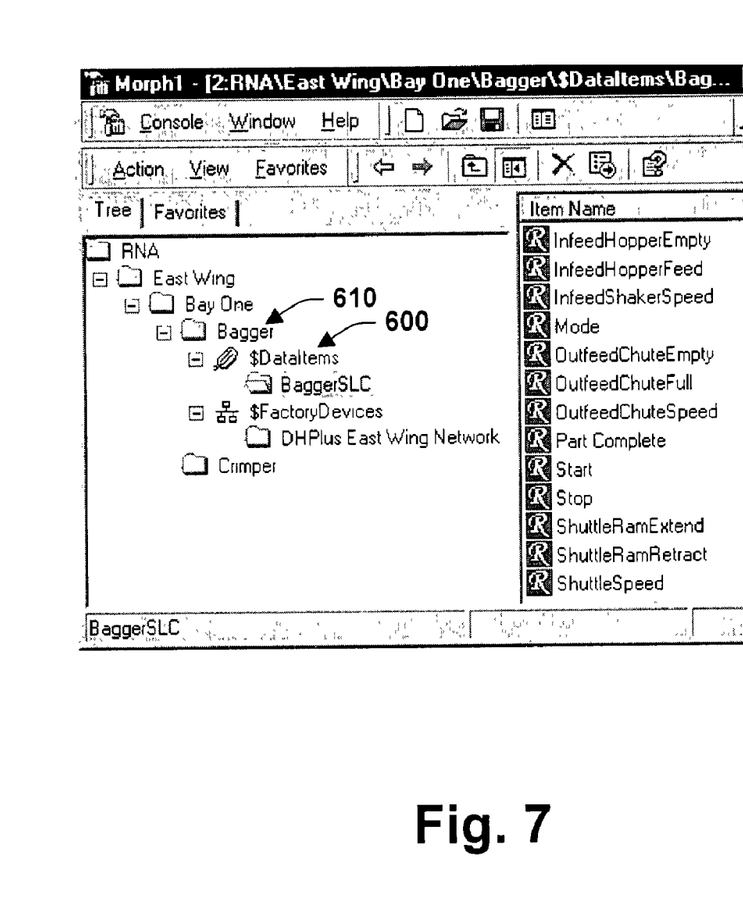
FIG. 7 is a diagram illustrating a named container within a service namespace in accordance with an aspect of the present invention.

In addition, similar groupings can be exposed in a $DataItems service 600, as shown in FIG. 7. Assuming that MfgComms process employed a DeviceName.DataItemName convention to identify individual data items, "BaggerSLC" becomes a container beneath the $DataItems service in the "Bagger" area 610. The use of a "named device" to scope data access service item names can be a decision on the part of the MfgComms server process and is generally not required by the Service Architecture.

Figure 6:
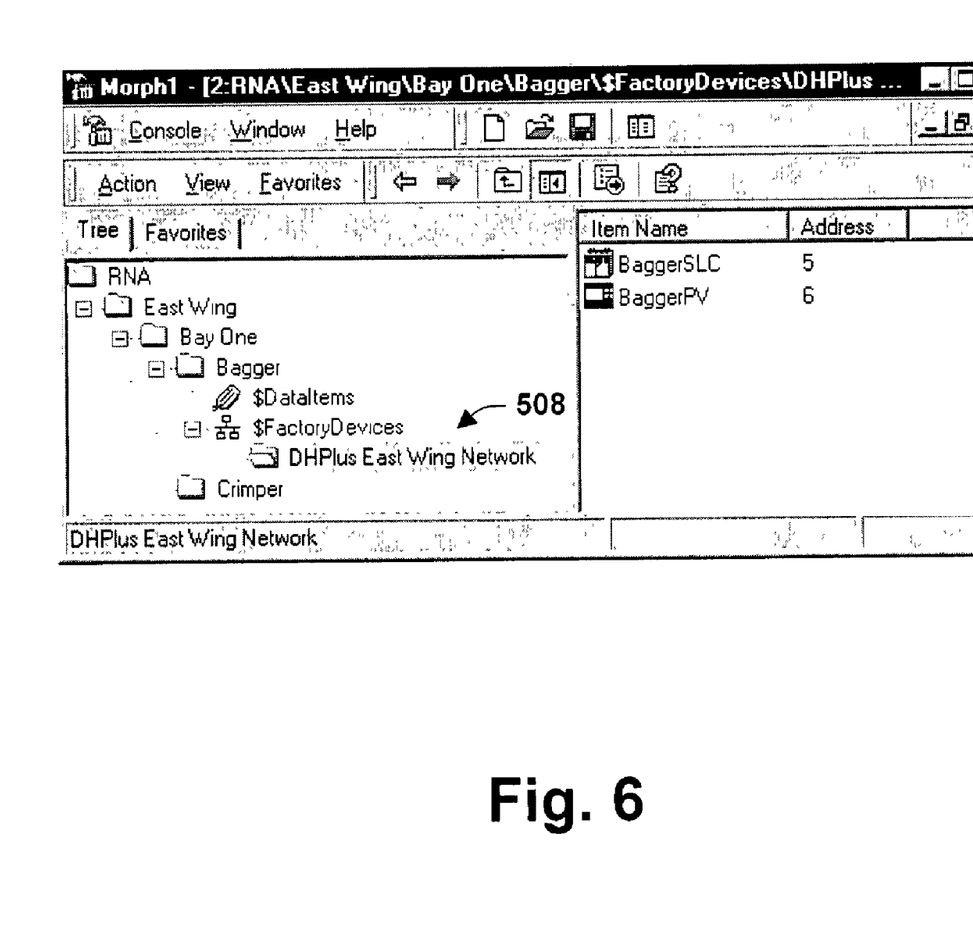
FIG. 6 is a diagram illustrating a network container within a network device topology in accordance with an aspect of the present invention.

The effect of service name hierarchy is illustrated in FIG. 6 and FIG. 7. These figures illustrate the Factory Topology and Data Access service namespaces, respectively. Both figures show server process name hierarchy within a service namespace, and locate that service within a similar area or access hierarchy. The area hierarchy is carried by the directory system element, while the service item names observed in the respective service namespace are defined and carried by the server process supporting that service behavior. Respective services can be namespace extensions exposing additional "service-specific" hierarchy. This service-specific hierarchy is at the discretion of the supporting server process, which is the example process MfgComms and generally is not a requirement of the Service Architecture.

Figure 8:
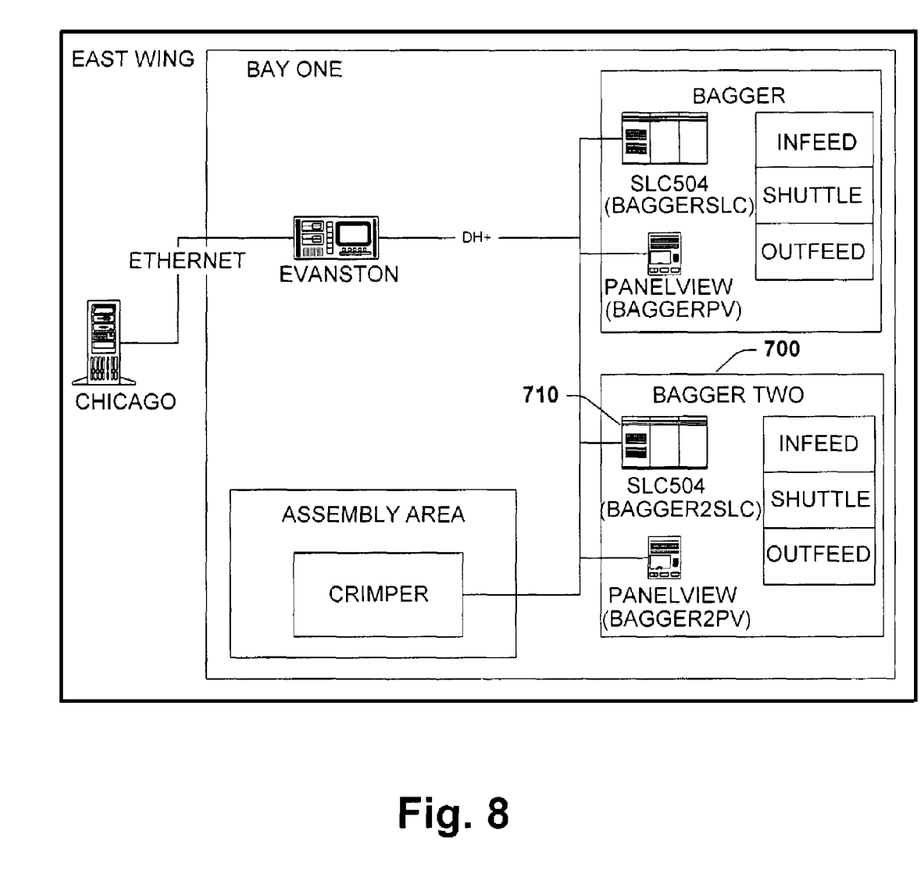
FIG. 8 is a diagram illustrating a multiple controller configuration in accordance with an aspect of the present invention.
Figure 9:
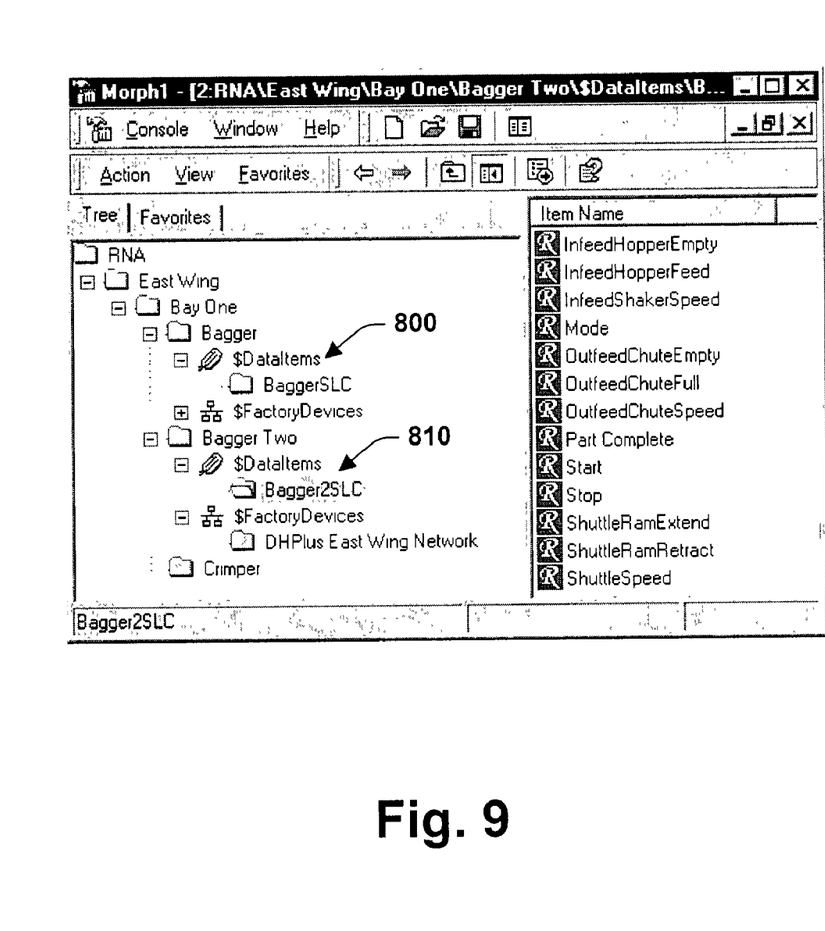
FIG. 9 is a diagram illustrating a service item namespace exposing service items from multiple controllers in accordance with an aspect of the present invention.

FIG. 8 illustrates an alternative and exemplary physical layout in accordance with an aspect of the present invention. In conjunction with introducing a second Bagger machine 700, a change in the configuration of the MfgComms process can include data values residing in a Bagger2SLC controller 710. This is reflected in the services supported by MfgComms, and in the corresponding service namespaces, as illustrated in FIG. 9. The net effect provides two namespace extensions, $DataItems and $FactoryDevices, exposed in a "Bagger" area 800 and "BaggerTwo" area 810. The processes which support these services apply some name syntax constraints to organize the service item names within the processes internal configuration, that is, the server process generally must segment its item configuration into two pieces, one associated with the Bagger area and the other with the Bagger2 area. Further, the hierarchy under a service item name, which is defined by the participating server process, can be exposed via the namespace to organize service item names. As can be appreciated, a plurality of such areas can be similarly defined in accordance with the present invention.

The Bagger process example described above describes the notion of a service item namespace, illustrating some of the concepts. For example, service item namespaces were constructed for namespace extension services such as "$Data Access" and "$Factory Devices", and some views were illustrative of how the service items supported by the MfgComms process can be defined in the area hierarchy. It is to be appreciated that a plurality of other services and hierarchies can be configured, however. One method for exposing a service in an access area places a directory entry in the area, with a directory entry whose properties identify the exposed service and reference a specific server process on a specific machine. The namespace component can then employ these "Server" directory entries to contact the server process and extract service item names.

While the above process can be employed, it can have some constraints. In particular, when a server process supports a service in several areas, identical directory entries generally would be needed in respective area containers, entries which would need to be kept congruent as the user modifies individual directory entry properties. Rather than a "find all the Server directory entries like this one and update them" behavior, the respective properties can be removed from the Area Model into a distinct directory hierarchy of their own, organized by service, computer and server process. Area containers in the access hierarchy can carry a directory entry which points into the service hierarchy.

Figure 10:
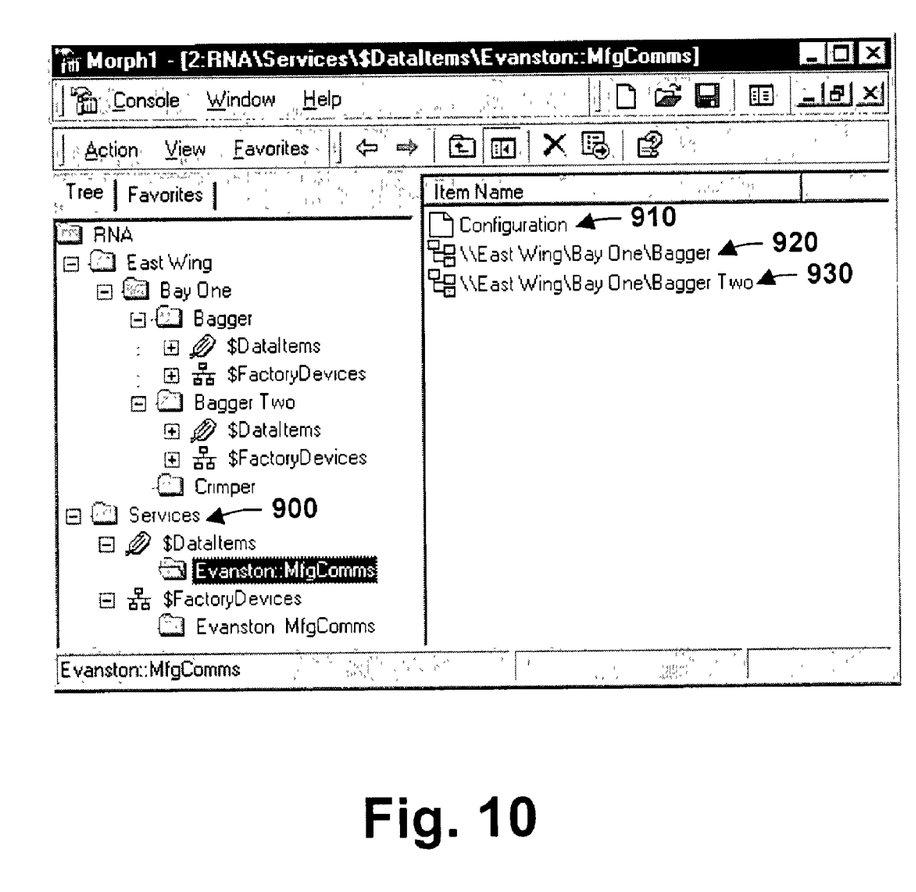
FIG. 10 is a diagram illustrating a service directory in accordance with an aspect of the present invention.
Figure 11:
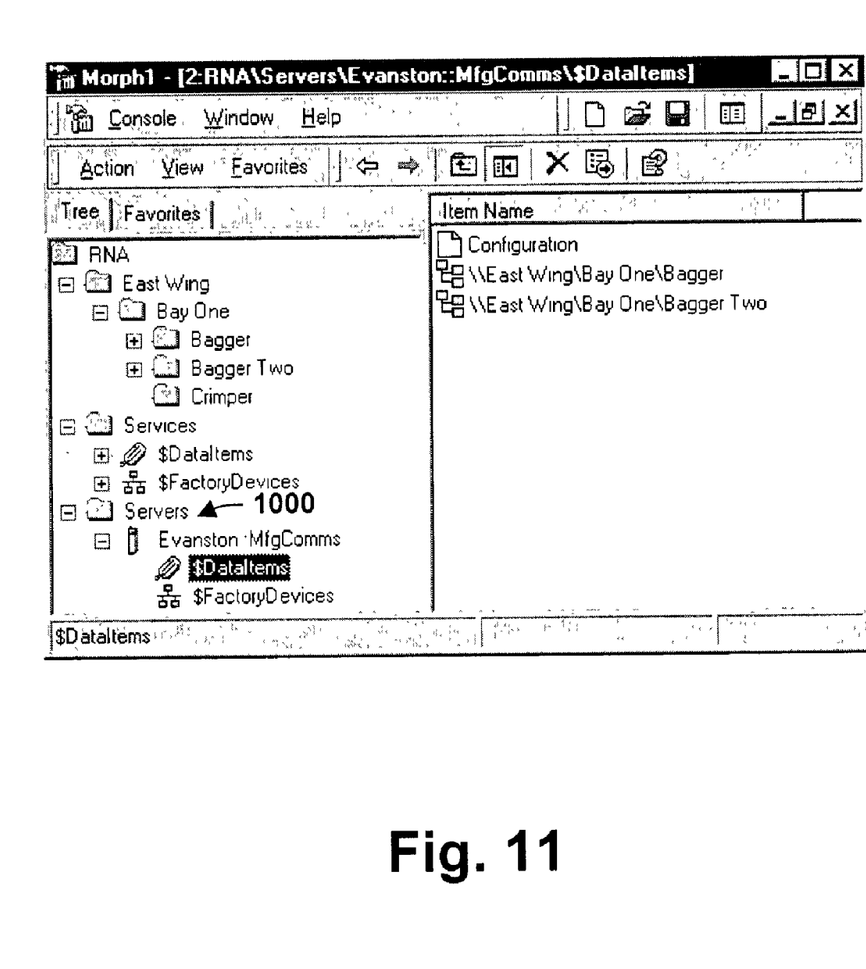
FIG. 11 is a diagram illustrating a servers directory in accordance with an aspect of the present invention.

This service hierarchy can be a distinct directory in its own right and is illustrated by FIG. 10. Under a "Services" container 900, services currently exposed are illustrated in the area hierarchy. In this example, the server process name and its host computer name are combined into a container name, using a computer::process convention. This container parents two forms of directory entries. The first is a "Configuration" directory entry 910, which is the connection and server reference information to form the service item namespaces discussed above. The second form is a reference to the access area in which the server process supports the service behavior. The example illustrates two areas ~\\East Wing\Bay One\Bagger 920 and \\East Wing\Bay One\Bagger 930—in which the MfgComms process supports the $DataItems service. Given an area access hierarchy and a service hierarchy, a "servers" hierarchy, can be constructed which is ordered along computer/processes/services dimensions. A version of this appears in FIG. 11. A servers hierarchy 1000 is depicted, wherein changes made in one leg of an Access/Services/Servers tripod can be reflected in other legs.

Figure 12:
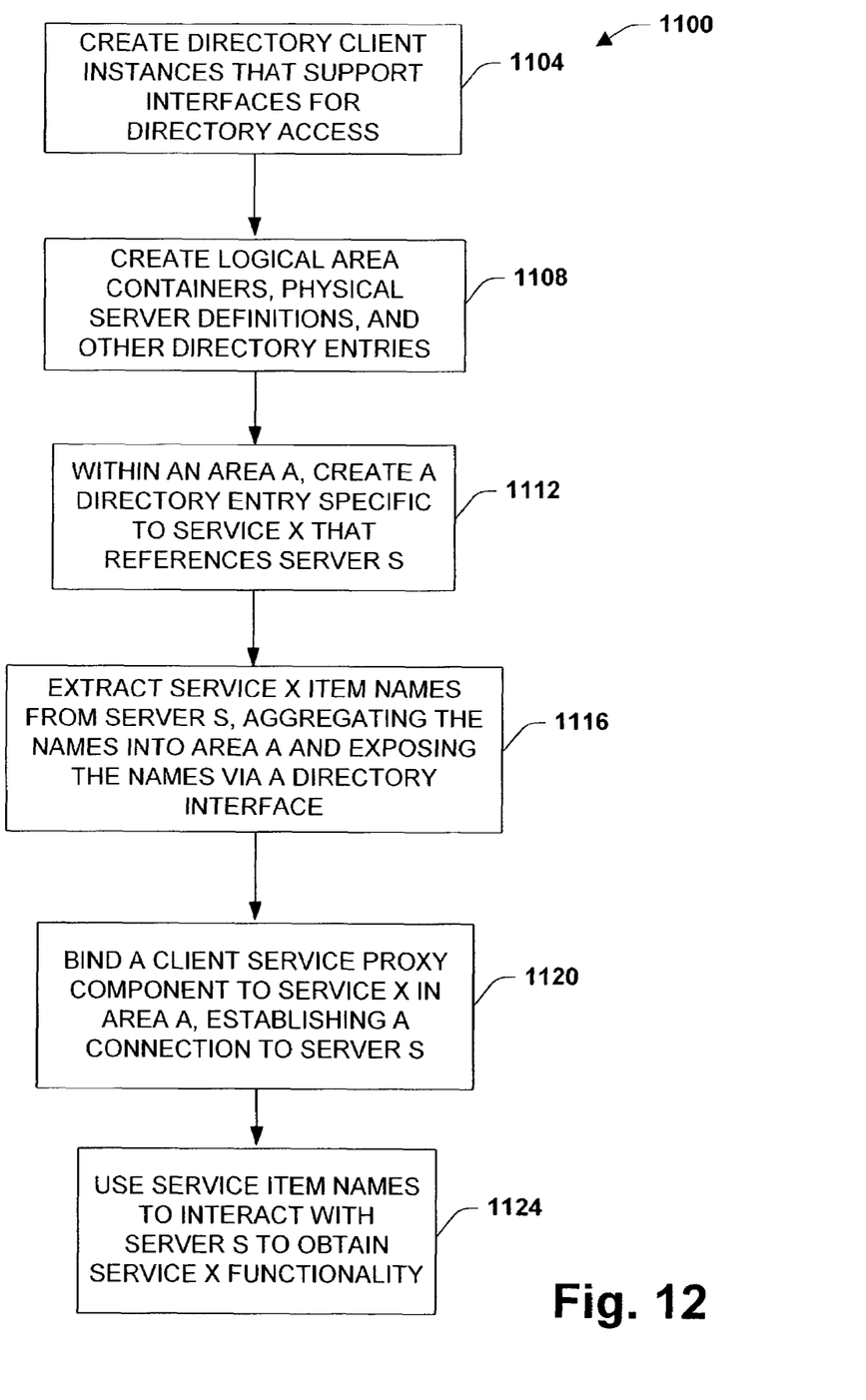
FIG. 12 is a flow diagram illustrating a methodology providing client and server interactivity in an industrial controller environment in accordance with an aspect of the present invention.

FIG. 12 illustrates a methodology 1100 to facilitate client and server interactions in accordance with the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Proceeding to 1104, directory client instances are created that support interfaces for directory access. At 1108, logical area containers, physical server definitions, and other directory entries are created. In one aspect at 1112, and within an area A, for example, a directory entry specific to a service X that references a server S is created, wherein A, X, and S are integers respectively. At 1116, the process extracts the service X item names from server S, aggregates the names into area A and exposes the names via a directory interface. At 1120, the process binds a client service proxy component to service X in area A, thus establishing a connection to server S. At 1124, service item names are employed to interact with server S to obtain service X functionality.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An industrial control service architecture, comprising:
a namespace component to aggregate a plurality of service names associated with one or more servers, the service names associated with a plurality of logical names, the servers operative to control at least one aspect of an industrial control process;
an interface component employed to access the namespace component via at least one of the plurality of logical names in order to facilitate communications to at least one physical device supported by the servers and
the namespace component presents a navigable namespace of the plurality of service names in an area access hierarchy that maps to a physical plant floor layout associated with location of the at least one device within the plant.

2. The system of claim 1, the interface component and the namespace component are adapted to operate on the same server.

3. The system of claim 1, the interface component and the namespace component are adapted to operate on a client and a server.

4. The system of claim 3, further comprising an industrial controller that operates as at least one of the client and the server.

5. The system of claim 1, the client interface component is exposed as an Active Directory Service Interface component.

6. The system of claim 1, further comprising a directory component that provides a persistent store of global information, the directory component includes objects that include at least one of applications, areas, and directory entries.

7. The system of claim 6, further comprising a directory client to bind service interfaces to the directory entries.

8. The system of claim 7, wherein the binding can include explicit binding and relative binding of the interfaces to the directory entries.

9. The system of claim 1, further comprising at least one of a name provider and a namespace extension, the name provider at least one of extracts service item names from supporting server processes and exposes internal structure of tier service item names, the namespace extension at least one of exposes service item names and acts as a bridge between tier namespace components.

10. The system of claim 1, further comprising a client proxy to provide an Application Program Interface and manage multiple servers on behalf of a client application.

11. The system of claim 1, further comprising a service configuration to facilitate creating directory areas and entries to expose services and to define servers.

12. The system of claim 1, further comprising a server process to support service behaviors and expose the behaviors and associated service items to one or more clients.

13. The system of claim 1, the namespace component is organized according to one or more tiers, the tiers including at least one server process, area, container, directory element, and directory entry.

14. The system of claim 13, further comprising a lower tier formed by aggregating service item names that are owned by server components within the context of an area.

15. The system of claim 14, further comprising prepending the service item names with a logical server process name in order to mitigate name collisions within an area.

16. The system of claim 1, further comprising multiple industrial controllers that are accessed and that communicate in accordance with the namespace component.

17. The system of claim 1, further comprising messaging commands that collect information into a structure having a name that refers to a physical device.

18. The system of claim 1, further comprising a service hierarchy that includes a container that houses one or more directory entries.

19. The system of claim 1, further comprising a servers hierarchy that is ordered along at least one of a computer, process and service dimension.

20. A method to facilitate component interactions with an industrial controller, comprising:
providing a namespace directory that includes one or more directory objects;
mapping the one or more directory objects into at least one of an area, an
application, and a directory entry; providing at least one client interface to access the namespace directory; and
defining a directory hierarchy based on a physical topology of automation devices analogous to physical locations of the automation devices within an installation.

21. The method of claim 20, the client access interface is exposed as an Active Directory Service Interface supported by a client-side component.

22. The method of claim 20, further comprising aggregating one or more service item names into one or more areas in order to provide a multi-tier namespace architecture.

23. The method of claim 22, further comprising extracting the aggregated service item names from supporting server processes and exposing the names according to the client interfaces provided.

24. The method of claim 20, further comprising providing one or more API's to facilitate access to server processes supporting client-side requests, wherein a client employs logical names to contact and interact with participating server processes.

25. The method of claim 20, further comprising creating directory areas and entries in order to at least one of expose various services and to define respective servers.

26. The method of claim 25, further comprising placing a directory entry in an area, the directory entry having properties to identify an exposed service and reference a server process on an associated machine.

27. The method of claim 25, further comprising defining a directory hierarchy organized by at least one of a service, computer, and server process.

28. An industrial control architecture, comprising:
means for aggregating a plurality of logical names associated with one or more servers into a hierarchy based on a physical layout of a plant floor, the servers operative to control at least one aspect of an industrial control process; and
means for accessing the plurality of logical names in order to facilitate communications to at least one physical device supported by the servers the plurality of logical names is aggregated in accordance with physical location of the at least one device within an installation.

29. An industrial control architecture, comprising:
a namespace component to aggregate a plurality of service names, the plurality of service names accessible by one or more clients, the service names associated with a plurality of logical names, the clients operative to interact with at least one aspect of an industrial control process;
an interface component employed to access the namespace component via at least one of the plurality of logical names in order to facilitate communications with the one or more clients and at least one physical device and
the namespace component provides a navigable namespace of the plurality of service names according to an access hierarchy mapping to a physical plant floor layout associated with location of the at least one device within an installation.

30. An industrial control system, comprising:
a namespace component to aggregate a plurality of service names, the plurality of service names accessible by one or more clients and one or more servers, the service names associated with a plurality of logical names, the clients and servers operative to interact with at least one aspect of an industrial control process; and
an interface component employed to access the namespace component via at least one of the plurality of logical names in order to facilitate communications with at least one physical device that is supported by the one or more clients and the one or more servers; and
the namespace component provides a structured hierarchy of the plurality of service names, the hierarchy maps to a physical plant floor layout which indicates location of the at least one physical device within an installation.

31. A method to facilitate component interactions in an industrial controller environment, comprising:
creating one or more directory client instances that support interfaces for a directory;
creating at least one of a logical area container, a physical server definition, and other directory entries in relation to the directory;
creating within the logical area container a directory entry specific to at least one service that references at least one server communicating with one or more industrial controllers; and
creating an access hierarchy of logical area containers that maps to a physical layout of the one or more controllers in an industrial environment.

32. The method of claim 31, further comprising at least one of:
extracting at least one service item name from the at least one server;
aggregating the at least one service item name into the logical area container; and
exposing the at least one service item name via a directory interface.

33. The method of claim 32, further comprising at least one of:
binding a client service proxy component to the at least one service; and establishing a connection to the at least one server.

34. The method of claim 32, further comprising employing the at least one service item name to interact with at least one server to obtain functionality from the at least one service.

* * * * *